UNITED STATES PATENT OFFICE.

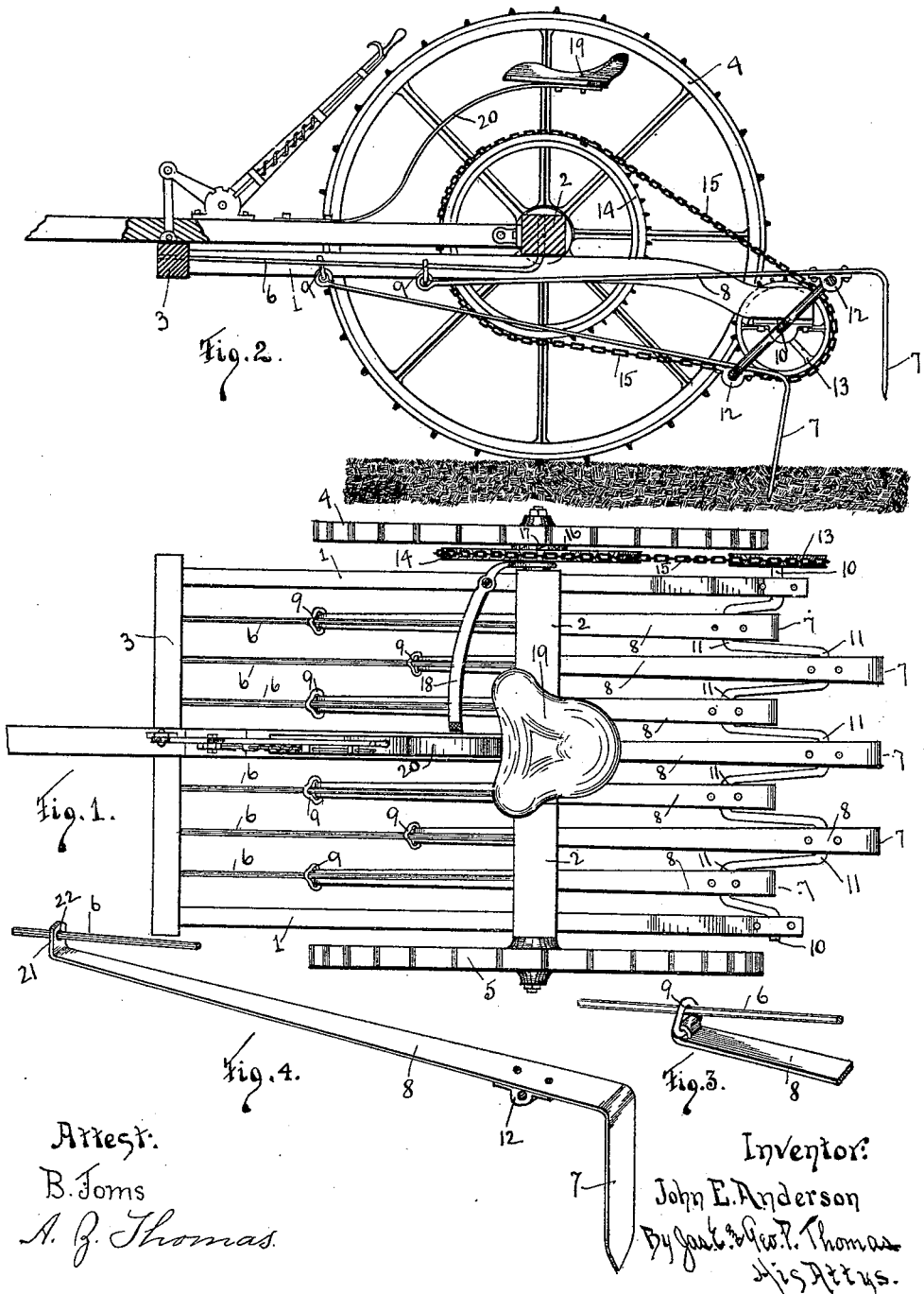

JOHN E. ANDERSON, OF ALABASTER, MICHIGAN.

LAND-CULTIVATOR.

SPECIFICATION forming part of Letters Patent No. 641,619, dated January 16, 1900.

Application filed April 13, 1899. Serial No. 712,949. (No model.)

*To all whom it may concern:*

Be it known that I, JOHN E. ANDERSON, a citizen of the United States, residing at Alabaster, in the county of Iosco and State of Michigan, have invented certain new and useful Improvements in Land-Cultivators, reference being had to the accompanying drawings, which form a part of this specification.

This invention relates to improvements in land-cultivators of the class which are provided with a series of teeth or blades for digging or hoeing up the ground on its surface for cultivating the same and preparing it for seed, &c.; and the object of the invention is to provide a device for cultivating land that will operate after the manner of an ordinary hoe, and which will stir up and pulverize the soil effectively and in a thorough manner, and which can be used on land having the stubble standing after the removal of a crop without clogging and catching up the debris.

Another object is to provide a means for cultivating land which will be easy of draft and cheap and simple in construction and operation.

The invention consists in a frame mounted on wheels and carrying a series of perpendicular blades, which enter the ground and which are provided on their upper ends with forwardly-extending guide-arms arranged on their forward ends to slide on guide-rods carried by said frame, and a shaft having a series of cranks extending in different radial directions and mounted on the rear portion of said guide-arms for imparting a vertical and also a horizontal reciprocating motion to the blades, and means for revolving said shaft as the machine is drawn forwardly over the land.

The invention also consists in the combination, arrangement, and construction of the several parts, together with the peculiar manner in which the blades are manipulated in first entering into the ground perpendicularly with the surface and then moving backward and then leaving the ground with a movement perpendicular to the surface, all of which will be hereinafter more fully described and which will also be set forth in the following specification.

In the accompanying drawings, Figure 1 represents a plan view of my improved cultivator. Fig. 2 is a vertical longitudinal section of the same. Fig. 3 is a view of one of the cultivator-blades detached, and Fig. 4 is the same made in a modified form.

The same reference characters represent like parts throughout the several views in the drawings.

1 represents the side pieces of a frame and are secured to an axle 2, while 3 is the front cross-piece, secured to the forward ends of the side pieces.

4 and 5 are wheels mounted on the ends of the axle outside of the frame-pieces, and 6 is a tongue secured by its rear end to the axle, and also by its rear portion to the cross-piece 3 for drawing and guiding the machine.

6 are a series of guide-rods distributed at a convenient distance apart and with their front ends secured to the front cross-piece 3, while their rear ends are secured to the axle 2.

7 are a series of vertical blades arranged to stand below and in rear of the axle 2, and these blades are provided on their upper ends with forwardly-extending arms 8, which have their forward ends each provided with a link or shackle 9, through which is passed one of the guide-rods 6 for holding the ends of the arms in position and to permit of a free reciprocating motion along the guide-rods.

Mounted in suitable boxes on the rear ends of the side pieces 1 is a shaft 10, and this shaft is provided between the side pieces with a series of cranks 11, one for each blade and extending in different radial directions, and each crank is secured by a suitable box 12 to the rear portion of one of the arms 8.

Upon the outer end of the shaft 10 is mounted a chain sprocket-wheel 13, and upon the axle near the wheel 4 is mounted a drive sprocket-wheel 14, upon which and upon the sprocket-wheel 13 is mounted an endless chain 15, while upon the outer side of the hub of the wheel 14 is provided a clutch mechanism 16, which is arranged for engaging with the clutch mechanism 17 on the hub of the wheel 4, and a lever 18 is pivoted upon the side frame-piece and is arranged with its outer end connected with the clutch mechanism 16, while its inner end portion extends across the frame to near its middle, so as to be convenient for operation with the foot of the driver for throwing the clutch into or out of engagement, as desired, the driver being seated upon a seat 19, which is supported by a spring 20, secured to the rear portion of the tongue.

In practice the clutch mechanism is operated to revolve the wheel 14 with the wheel 4, and this wheel by the chain 15 and wheel 13 imparts revolution to the shaft 10 and cranks 11, as the machine is drawn over the ground by the team which is secured to the tongue, and as these cranks revolve a portion of the series of blades is lifted and carried forward, while the other portion of the series of blades is moved downward into the soil and moved backward with a rapid motion, and as the machine is being drawn forward at the same time the blades are entering the ground the forward movement of the blades is compensated for by the forward movement of the machine, so that the blades enter the ground practically perpendicular to the surface of the ground and then, as they are moved rearward and lifted at the rear portion of their movement, the forward movement of the machine, with the movement of the cranks on their upward sweep, causes the blades to leave the ground with a movement perpendicular thereto, so that all dragging of the blades forwardly through the soil is avoided, and a movement similar to the ordinary movement of a hoe worked by hand is obtained and a thorough and effective working of the soil is accomplished.

It will be seen that for working in soil that contains the stubble and debris of recently-cut grain this implement is superior, as each blade works independently of the other, and as the blades enter and leave the soil with a vertical movement practically at rest in relation to the forward movement of the machine the blades enter the soil between the standing stubble of grain, and in leaving the soil all debris caught by the rearward movement of the blades is left behind and the implement runs without clogging.

In Fig. 3 is shown one of the blades detached and enlarged, and the arm 8 is provided with a link or shackle 9, which provides for a free movement of the arm along the guide-rod 6; but this construction is not entirely essential, as other well-known means for attaching the forward ends of the arms may be used, and as an illustration of an equivalent construction Fig. 4 shows the arm provided with an upturned end 21, which is provided with an opening 22, for receiving and sliding over the guide-rod 6, in practically the same manner and with the same result as were the shackle 9 used, and I have shown the blades as being provided with a wide square digging end, somewhat after the form of an ordinary hoe; but as shown in Fig. 4 the end of the blade may be provided with a rounded or tapering end, which would enter the ground with less jar and would also require less power to be exerted. Therefore I do not limit my invention entirely to the precise details of construction shown; but

What I claim is—

1. In a land-cultivator, the combination of the wheels carrying the axle and the frame mounted upon the axle, the guide-rods arranged in series with their front ends secured to the front cross-piece of the frame and with their rear ends secured to the axle, a series of vertical blades arranged in rear of the axle and provided with arms extending forwardly beneath the axle and provided on their front ends with devices for attachment to and for sliding on the guide-rods, a shaft mounted on the rear portion of the frame and provided with a series of cranks each crank being journaled to the rear portion of one of said arms, a sprocket-wheel mounted upon the end of the crank-shaft, a sprocket-wheel mounted to turn with one of the wheels on the axle, and an endless chain mounted on the said sprocket-wheels, substantially as set forth.

2. In a land-cultivator the combination of the wheels carrying an axle, and a frame mounted on the axle, with a series of guide-rods having their forward ends secured to the front cross-piece of the frame and extending rearwardly to the axle, a series of vertical blades having their upper ends provided with forwardly-extending arms having their front ends arranged for sliding on said guide-rods, a shaft journaled upon the rear portion of said frame and provided with a series of cranks each of which is journaled to the rear portion of one of said arms and mechanism for revolving the shaft as the machine is drawn forward, substantially as set forth.

In witness whereof I hereunto affix my signature in the presence of two witnesses.

JOHN E. ANDERSON.

Witnesses:
J. S. MEILSTRUP,
GEO. P. THOMAS.